Feb. 17, 1953   R. J. BRANSON   2,628,418
METHOD OF FORMING MULTIPLE SEGMENT TANKS
Filed April 4, 1949   2 SHEETS—SHEET 1

INVENTOR.
R. J. Branson
BY
C. M. McKnight

Feb. 17, 1953 R. J. BRANSON 2,628,418
METHOD OF FORMING MULTIPLE SEGMENT TANKS
Filed April 4, 1949 2 SHEETS—SHEET 2

INVENTOR.
R. J. Branson
BY
C. M. McKnight

Patented Feb. 17, 1953

2,628,418

UNITED STATES PATENT OFFICE 2,628,418

METHOD OF FORMING MULTIPLE SEGMENT TANKS

Raymond J. Branson, Tulsa, Okla., assignor to McNamar Boiler & Tank Company, Inc., Tulsa, Okla., a corporation of Oklahoma Application April 4, 1949, Serial No. 85,337

4 Claims. (Cl. 29—148.2)

This invention relates to pressure containers and more particularly, but not limited thereto, to the method of laying out and proportioning the dimensions of the material for forming spherical or cylindrical metal tanks adapted for use in the storage and transportation of fluids under pressure, such as liquefied petroleum gases, and other volatile liquids, and non-condensible gases.

At present, spherical tanks are commonly fabricated by welding together in edge-to-edge relatoinship a multiplicity of die-shaped individual segments of a sphere. It will be apparent that such procedure involves considerable time and expense not only in laying out and cutting the material for the individual segments but also in forming the segments, positioning them, and welding them to complete the spherical body.

Another method for making spherical tanks involves joining together two hemispherical segments, which are formed by drawing or cupping circular discs of a deep drawing sheet or plate material, such as drawing-quality steel. However, such deep-drawing material ordinarily has insufficient tensile strength to be suitable in thin sections for pressure tanks. Further, high tensile strength materials ordinarily are not sufficiently ductile to permit cold drawing into hemispheres without developing cracks.

The present invention is concerned with the laying out of tubular, sheet or plate material in such relative proportions that a spherical tank may be fabricated by joining together three mating segments which are formed from the material. Also a cylindrical tank may be made from five segments. The use of three segments laid out in accordance with my invention has many advantages over the prior art methods described above. The three segments, which may be cut from flat material, are of such shape that they may be easily laid out and cut to size with only a small amount of waste material. The segments may be readily formed into the desired semispherical shapes with the deformation or drawing of the material sufficiently limited so as to prevent cracking of high tensile strength materials. The surface area of the material is substantially the same both before and after shaping, so that the deformation of the material in tension and compression during the forming is well proportioned and no excessive elongation or compression is encountered. The three segments are so sized that, after being formed, the edges match nicely and the final welding, or joining may be performed with little difficulty. Further, in comparison with multi-segment tanks, the welding footage is greatly reduced. Also, it will be apparent that my invention is adaptable to the fabrication of five-segment cylindrical tanks having hemispherical ends.

In fabricating a spherical tank in accordance with the method of my invention, the diameter is first determined from the desired capacity by the use of well-known formulae and conversion factors. The diameter may be expressed in any convenient unit, such as, feet or inches, and the formulae disclosed herein below are applicable to any dimensional units as long as the units are consistent.

It is an important object of this invention to lay out and cut to size, three pieces of material, which, after being formed into a semispherical shape, will match in an edge-to-edge relationship to form the completed sphere.

Another object of this invention is to provide a generalized equation for pre-determining the dimensions of the material for fabricating a three segment spherical tank.

A still another object of this invention is to predetermine the material size for a three segment spherical tank or a five segment cylindrical tank so that the plastic deformation of the material during the forming operation will be minimized.

And still another object of this invention is to provide a method for fabricating multiple segment tanks which is adaptable to the use of high tensile strength materials.

And still another object of my invention is to provide a method for fabricating a five segment cylindrical tank having hemispherical ends.

Other objects and advantages will be apparent during the course of the following description.

In the accompanying drawings, forming a part of this specification, and in which like numerals are employed to designate like parts throughout the same, Fig. 1 is an exploded view of three formed segments prior to joining into a spherical tank.

Figure 1:
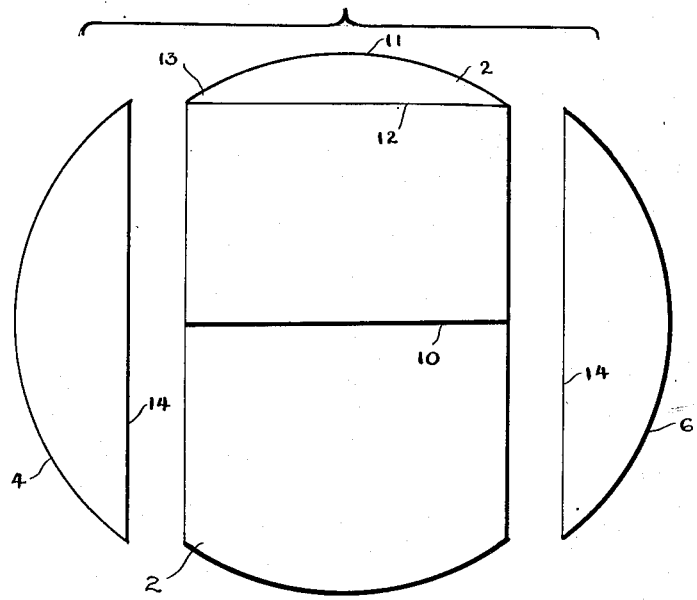
Figure 2:
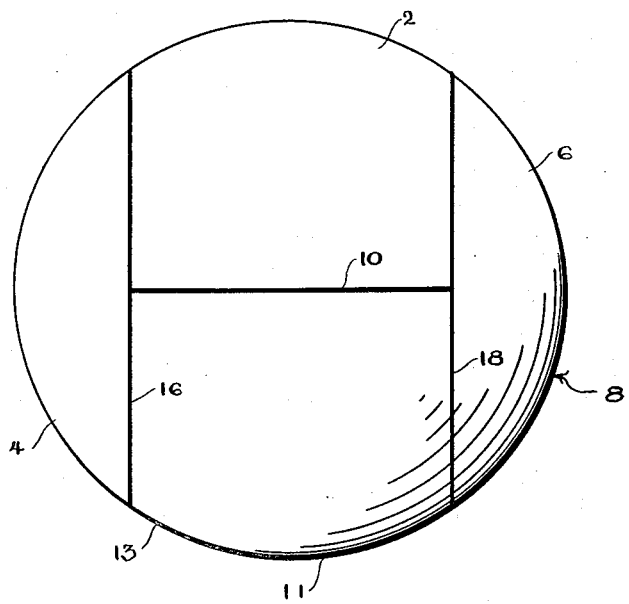
Fig. 2 is a view of a completed spherical tank, fabricated in accordance with my invention.

Referring to Fig. 1, the pre-formed semispherical center section 2, and the two end segments 4 and 6 make up a three segment spherical tank 8 (Fig. 2). The center segment 2 may be formed from a section of tubing or pipe, or from flat sheet or plate material. If flat material is used, a rectangular flat piece (not shown) is first rolled into a cylindrical shape and the ends mating in an edge-to-edge relationship are suitably joined, as by welding, as illustrated by welding seam 10. The axis of the rolling operation is perpendicular to the lengthwise dimension of the flat rectangular stock. From a practical standpoint, in order to reduce the tendency to develop cracks along slight imperfections in the material during later forming operations, it is preferable to lay out the rectangular flat stock lengthwise in direction of rolling, or with the grain. The cylindrical section is then formed into the desired truncated spheriform shape 2 as illustrated in Fig. 1, by means well-known in the art, such as the use of shaping rollers, or pressing dies in any suitable machine. In the final forming of the center segment, the middle portion 11 of the welded cylinder is expanded and elongated hoop-wise around the article, while the two outer portions 13 undergo deformation in compression hoop-wise. The finished center segment 2 has a width, illustrated by the length of the chord 12, which is shorter than the length of the cylinder from which it is formed.

The end segments 4 and 6 are formed from circular discs (not shown) of flat stock by cupping with suitable semi-spherical male and female dies (not shown). The final diameter, or chord 14 of the cupped end segments 4 and 6 is less than the diameter of the disc (not shown) from which it is formed.

Referring to Fig. 2, the three spheriform segments, 2, 4, and 6, are suitably joined, as by welding in edge-to-edge relationship around the seams 16 and 18 to complete the spherical tank 8.

In order to form three segments 2, 4, and 6 so that they will mate in edge-to-edge relationship and to obtain the desired balance between plastic deformation in tension and in compression during forming, the raw material is cut to size substantially in accordance with the following generalized formulae. If flat stock is used for the center segment 2 the rectangular dimensions are substantially:

$$\text{Width} = \frac{pi \times D \times \text{arc sine } W/D}{180}$$

$$\text{Length} = \frac{180 W}{\text{arc sine } W/D}$$

Where $D$ is the diameter of the finished sphere, $W$ is the length of the chord 12 in Fig. 1, and arc sine $W/D$ is the angle, expressed in degrees, the sine of which is $W/D$.

If the center segment is to be formed from a section of tubing or pipe rather than flat stock, the length of the cylindrical section is determined by the above "width" formula, and the diameter is the above "length" formula divided by "pi," (3.1416) as follows:

$$\text{Tubing or pipe diameter} = \frac{180 W}{pi \times \text{arc sine } W/D}$$

The diameter of the flat discs from which the end segments are formed is substantially:

$$\text{Diameter} = \sqrt{2D(D-W)}$$

where $D$ and $W$ have the above-noted significance.

The formulae of my invention are such that the surface area of each segment is identical before and after the spheriforming operation. Thus, the plastic deformation in tension (elongation) obtained during forming is counterbalanced by deformation in compression, which results in a distribution between the two types of deformation.

It will be apparent from examination of the above formulae that the relative sizes of the center and end segments before forming is entirely dependent upon the length of the chord, $W$, relative to the diameter, $D$, of the finished sphere. The value of $W$ may be arbitrarily set for some practical consideration, e. g., so that the calculated width of flat stock corresponds to a standard size available or so that a standard tubing or pipe diameter may be used. However, in order that the plastic deformation in forming is well-balanced between the center and end segments, the value of ratio $W/D$ is preferably approximately 0.556, or $W=0.556D$, as determined by equating the "length" formula with the "diameter" formula for the flat discs multiplied by "pi."

By substituting ($W=0.556D$) in the above formulae the following optimum material sizes have been calculated in terms of the spherical tank diameter, designated as "$D$." With the center segment fabricated from sheet or plate:

Optimum width=$0.590D$
Optimum length=$2.96D$

With tubing or pipe being used for forming the center segment,

Optimum length=$0.590D$
Optimum diameter=$0.942D$

For the flat circular discs from which the end segments are formed.

Optimum diameter=$0.942D$

It is significant that, before the semi-spherical shapes are formed, the optimum diameter for the center segment cylinder is identical to that for the end-segment discs. Thus, during the spheri-forming operations, the plastic deformation in compression around the edges of the optimum center cylinder 2, and the end discs 4 and 6 is identical.

After cutting and forming with the appropriate dies, the three segments substantially match in edge-to-edge relationship, and are joined, as by welding, to form the completed three-segment spherical tank 20.

Figure 3:
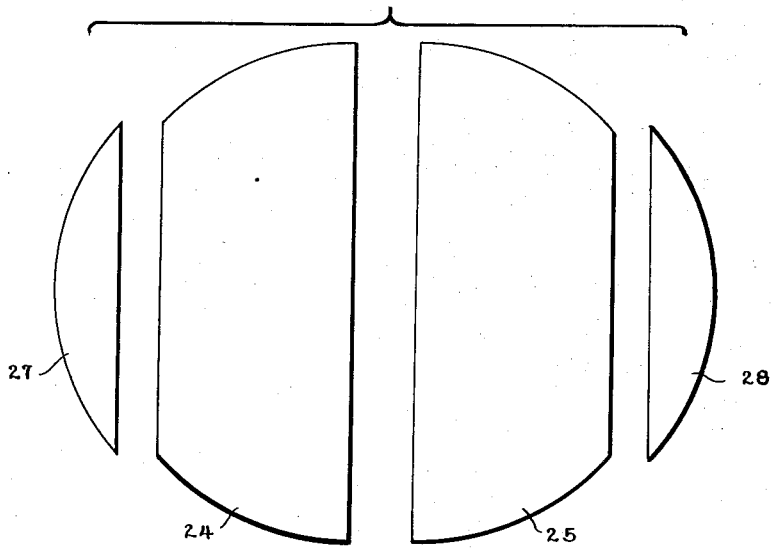
Fig. 3 is an elevational view showing four segments of a modification for a five segment cylindrical shaped tank prior to completion into a composite body.
Figure 4:
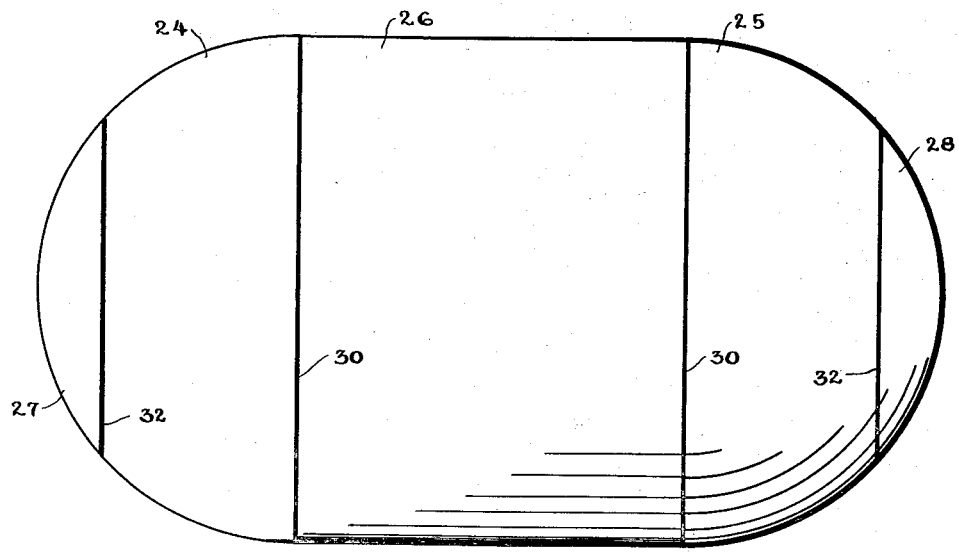
Fig. 4 is a view of Fig. 3 showing the completed five segment cylindrical shaped tank.

It will be apparent that my invention is adaptable to the fabrication of five-segment cylindrical tanks having hemispherical ends as shown in Fig. 4 as a modification. In this case the diameter of the cylindrical tank is applied to the above formulae and the three spherical segments are cut and formed (Fig. 1) as described above. However, after forming, the partially spherical center segment 2 (Fig. 1) is cut in two vertically, in a plane perpendicular to the axis, and each half 24 and 25 (Fig. 3) is joined, as by welding, to the ends 30 (Fig. 4) of a cylindrical section 26 of the appropriate diameter and length. The end segments 27 and 28 are joined at 32 to the divided halves 24 and 25, as described above, to complete the five-segment cylindrical tank.

The application of the formulae of my invention to the fabrication of pressure tanks is illustrated by the following examples. It is assumed that a number of spherical steel pressure tanks are to be fabricated with a capacity of approximately 100 gallons, or 23,100 cubic inches. By application of the conventional formula, the inside radius is conventionally calculated to be 17.66 inches. If the pressure and materials of construction are such that a tank of this size must be fabricated from ⅜ inch plate, the outside radius is approximately 18 inches, or an outside diameter of approximately 36 inches. If flat plate material is to be used throughout, the optimum dimensions for the rectangular width and length and the diameter of the circular discs are 21.25, 106.6 and 33.9 inches, respectively as determined from the optimum proportion formula. The raw material may be laid out and cut to these dimensions.

However, assuming, for example, that it is desired to use an available quantity of ⅜ inch steel plate 20 inches wide, thus for forming a tank of the above volume having approximately a 36 inch diameter, the following calculations from the formula are as follows: Set the generalized "width" formula equal to 20 and substitute "$D$"=36. The arc sine $W/D$ is found to be 31.8 degrees. The value of $W/D$ is 0.527, which is the sine of 31.8 degrees, and W is 0.527×36 or 19.0 inches. By substituting in the generalized "length" and "diameter" formulae it is determined that the 20-inch wide plate is to be cut to 107.5 inch lengths, and the circular discs are to be 35.0 inches in diameter. In the above example the rectangular plate of 107.5 length is rolled and welded into a cylindrical section having a diameter 34.2 inches, which is obtained by dividing the length of the plate by "pi."

As an example of the application of my formulae to the modified five-segment cylindrical pressure tanks with hemispherical ends (Figs. 3 and 4), it is assumed that it is desired to fabricate 300-gallon tanks with a 36-inch outside diameter out of ⅜ inch plate. The hemispherical ends of Fig. 4 together have a capacity of about 100 gallons, and are fabricated from flat plate as described in the above example for 100-gallon spherical tanks except that the partially spherical center segment 2 (Fig. 1) is cut in half after forming, and then welded to a 36-inch cylindrical section, which must hold 200 gallons.

It will be apparent that the dimensions of the cylindrical sections may be easily computed from the volume in gallons simply by computing the conventional area formula times the length. For example: 200 gallons times 231 cubic inches per gallon equals 46,200 cubic inches.

$$\frac{L \times \text{pi } D^2}{4} = 46{,}200$$

$$L = \frac{46{,}200 \times 4}{\text{pi} \times 35.3^2}$$

Thus using the approximate 35.3 inch inside diameter, the length of the cylindrical section is calculated to be approximately 47.5 inches. From the above it will be apparent that if the cylindrical section is fabricated from ⅜ inch rectangular plate that the length may easily be computed with the known approximate diameter, consequently, the rectangular plate would be 47.5×113 inches in width and length.

From the foregoing it will be apparent that the present invention contemplates a method of forming tanks by pre-forming a plurality of segments of such dimensions that the total area of the segments prior to pre-forming is equal to the total area of the tank as formed. Furthermore, the invention contemplates the use of known quantities of material to provide a pre-determined size of tank, and particularly in forming a multiple-segment tank eliminates considerable welding footage and waste of material.

Changes may be made in the specification and drawings without departing from the spirit of the invention within the scope of the following claims, as set forth.

I claim:

1. The method of forming a spherical container from three pre-formed segments of partially spherical shape which consists of forming a tubular center segment by rolling and welding a rectangular plate having predetermined values of width and length in accordance with the following equation:

$$\text{Width} = \frac{\text{pi} \times D \times \text{arc sine } W/D}{180}$$

$$\text{Length} = \frac{180}{\text{arc sine } W/D}$$

wherein:

$D$ = the desired diameter of the finished sphere
$W$ = the length of the chord between the axial ends of the partially spheriformed center segment.

spheriforming the tubular segment so that the entire segment is of substantially spherical configuration, forming each of the remaining segments into a substantially spheriformed disc from a circular flat disc having a pre-determined diameter in accordance with the following equation:

$$\text{Diameter } \sqrt{2D(D-W)}$$

wherein:

$D$ = the desired diameter of the finished sphere
$W$ = the length of the chord between the axial ends of the substantially spheriformed center segment, butt welding one of said spheriformed discs to each end of the spheriformed center segment.

2. The method of forming a spherical container from three segments of partially spheroid shape which consists of spheriforming a substantially spherical segment from a tubular center segment having pre-determined values of diameter in accordance with the following equation:

$$\text{Tubing or pipe diameter} = \frac{180W}{\text{pi} \times \text{arc sine } W/D}$$

wherein:

$D$ = the desired diameter of the finished spheroid
$W$ = the length of the chord between the axial ends of the spheriformed tubular segment, forming each of the remaining segments into a spheriformed disc from a flat disc having a pre-determined diameter in accordance with the following equation:

$$\text{Diameter} = \sqrt{2D(D-W)}$$

wherein:

$D$ = the desired diameter of the finished sphere
$W$ = the length of the chord between the axial ends of the spheriformed tubular segment, butt welding one of said spheriformed discs to each end of the substantially spheriformed center segment.

3. The method of forming a spherical container from a plurality of segments which consists of cutting a rectangular flat plate into predetermined dimensions of length and width, shaping the flat plate into a tubular body, shaping the tubular body into a substantially spheroid configuration throughout its entire length by a balanced expansion and compression of the material to provide a surface area for the body after spheriforming substantially equal to the surface area prior to spheriforming, substantially spheriforming a pair of flat circular discs having a surface area after spheriforming substantially equal to the surface area therefor prior to spheriforming, welding a partial spheriformed disc to each end of the spheriformed body to provide a closed spheroid.

4. The method of forming a spherical container set forth in claim 3 which includes shaping both the tubular body and the circular discs so that the optimum diameter of the tubular body is equal to the optimum diameter of each of the discs.

RAYMOND J. BRANSON.

REFERENCES CITED

The following references are of record in the file of this patent:

UNITED STATES PATENTS

| Number | Name | Date |
|---|---|---|
| 1,216,733 | Rowland | Feb. 20, 1917 |
| 1,428,060 | Richman | Dec. 18, 1923 |
| 1,526,140 | Gruver | Feb. 10, 1925 |
| 1,691,491 | Nelson | Nov. 13, 1928 |
| 2,073,684 | Coakley | Mar. 16, 1937 |
| 2,139,682 | Hothersall | Dec. 13, 1938 |
| 2,171,972 | Debor | Sept. 5, 1939 |
| 2,503,190 | Branson | Apr. 4, 1950 |
| 2,503,191 | Branson | Apr. 4, 1950 |

FOREIGN PATENTS

| Number | Country | Date |
|---|---|---|
| 17,363 | Great Britain | Oct. 19, 1888 |
| 580,720 | Great Britain | Sept. 18, 1946 |